United States Patent [19]
Kukson et al.

[11] Patent Number: 4,853,802
[45] Date of Patent: Aug. 1, 1989

[54] SINGLE STAGE FEEDFORWARD EQUALIZER

[75] Inventors: Dean R. Kukson, Byron, Minn.; Constantin M. Melas, Los Gatos, Calif.; Joey M. Poss, Rochester, Minn.

[73] Assignee: International Business Machines Corporation, Armonk, N.Y.

[21] Appl. No.: 114,478

[22] Filed: Oct. 28, 1987

[51] Int. Cl.$^4$ .......................... G11B 15/14; G11B 5/09
[52] U.S. Cl. .......................................... 360/65; 360/46
[58] Field of Search ............................ 360/65, 46, 67; 333/28 R

[56] References Cited
U.S. PATENT DOCUMENTS

| | | | |
|---|---|---|---|
| 4,314,288 | 2/1982 | Gyi | 360/65 |
| 4,635,143 | 1/1987 | Suzuki et al. | 360/65 |

Primary Examiner—Vincent P. Canney
Attorney, Agent, or Firm—Robert W. Lahtinen

[57] ABSTRACT

An equalizer circuit is shown which conditions a read back signal from a data storage device by performing amplitude correction (pulse slimming) and phase correction. The circuit provides a simplified single stage that effects both amplitude and phase correction and does so using components that can be selected or adjusted independently of one another. Further, the principal embodiment shows a single ended circuit that provides the function with a minimum number of components to conserve space on the circuit card as well as reducing cost.

7 Claims, 5 Drawing Sheets

SINGLE STAGE FEEDFORWARD EQUALIZER

BACKGROUND OF THE INVENTION

This invention relates to the field of processing readback signals representing data recorded on a storage media which are read using a transducer means and more particularly to a simplified circuit for data signal processing.

The use of an equalizer on the input signal from magnetic data storage devices affords a significant reduction in the soft error rate that can provide significant increase in storage capacity at a given tolerated error rate. This can result in an error rate improvement of 100 times or two orders of magnitude. This improvement, in conjunction with transducer head and media development, make possible the major portion of recent storage density improvements.

A feedforward equalizer consists of a passive network and a differential amplifier. The input signal to the passive network is "fed forward" and summed or differenced with a portion of the network output signal. The resulting signal is the equalized output. An early equalizer of this type is described in "An Improved Pulse Slimming Method For Magnetic Recording" by R. C. Schneider, IEEE Transactions on Magnetics, Sept. 1975, pp. 1240-1241.

The development of equalizer devices has included two stage devices in which each stage functioned to equalize both amplitude and phase. This intermixing of the functions results in adjustment complexity.

Equalizers have been improved by a circuit that uses two feed forward stages, but permits independent control of amplitude and phase (IBM Technical Disclosure Bulletin, Oct. 1977, pp. 1705-1706, "Time Domain Adjustable Equalizer by F. Castor and H. J. Gardner).

It has been shown that amplitude equalization can be accomplished using a single feedforward stage, if the passive network is a reflective delay line. This device has been called a cosine equalizer in the article "Improvement of Recording Density By Means of Cosine Equalizer" by T. Kameyama, S. Takanami and R. Arai, IEEE Transactions on Magnetics, Nov. 1976, pp. 746-748. Another solution is a four stage structure with two stages used for amplitude equalization and two stages for phase equalization, as shown in U.S. patent application Ser. No. 815,110 filed Dec. 31, 1985. Thus all feedforward equalizers which correct both amplitude and phase use a minimum of two stages while single stage equalizers have had the capability of equalizing for amplitude only.

SUMMARY OF THE INVENTION

The resistance-inductance-capacitance (RLC) equalizer of the present invention uses a single stage with the ability to correct both phase and amplitude with non-interfering controls. As shown and described, the equalizer is followed by a low pass filter for noise suppression. The amount of pulse slimming is controlled by a pair of series connected resistors and phase equalization is effected by a capacitor and an inductor. In particular, the phase distortion introduced by the low pass filter can be corrected by choosing the inductance and capacitance such that $$\frac{1}{2\pi\sqrt{LC}}$$

equals approximately 0.8 times the filter cutoff frequency. In the absence of further phase compensation, the characteristic impedance $$\sqrt{\frac{L}{C}}$$

must equal half the total resistance of the pair of series connected resistors.

DETAILED DESCRIPTION

Figure 1:
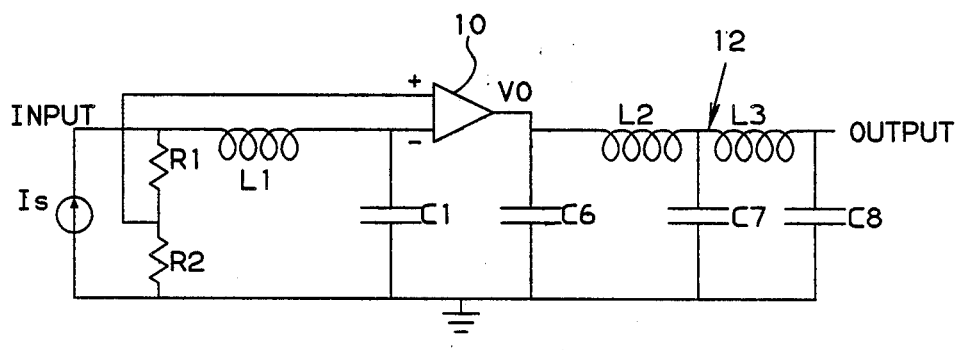
FIG. 1 is a simplified schematic of the single stage equalizer of the present invention including the independent adjustment of amplitude and phase.

FIG. 1 is a schematic showing of the single stage RLC feedforward equalizer of this invention followed by a five pole, Butterworth low pass filter for noise suppression. The equalizer receives a data signal which is read by a transducer from a storage media and is current driven from the AGC circuitry and transmits the equalized signal to the detector (DET) circuitry. The amount of pulse slimming (amplitude) equalization is controlled by resistors R1 and R2. The phase equalization is controlled by capacitor C1 and inductance L1. For initial selection of L and C, the phase distortion introduced by the low pass filter can be corrected by choosing the values of L1 and C1 such that:

$$\frac{1}{2\pi\sqrt{LC}}$$

equals substantially 0.6 to 0.8 times the filter cutoff frequency. In the absence of further compensation, the characteristic impedance:

$$\sqrt{\frac{L}{C}}$$

should equal approximately half of the total resistance R1+R2, where (R1+R2) is chosen as the DL load resistance for Is.

$$H(s) = \frac{Vo}{Is} = AR1 \frac{1 - s^2 L1 C1 \frac{R2}{R1}}{1 + sC1R + s^2 L1 C1} \quad \text{EQUATION 1}$$

$$H(jw)_{Phase} = -\frac{PI}{2} + \arctan \frac{wRC1}{1 - w^2 L1 C1} \quad \text{EQUATION 2}$$

$$|H(jw)|^2_{Gain} = \frac{[AR1]^2 \left[1 + w^2 L1 C1 \frac{R2}{R1}\right]^2}{(1 - w^2 L1 C1)^2 + (wRC1)^2} \quad \text{EQUATION 3}$$

With reference to FIG. 1, the transfer function, H(s), of the equalizer is given in Equation 1, where A is the amplifier gain, $s=jw$, $R=R1+R2$ and $w=2f \times Pi$ is the angular frequency. The phase of the H(jw) is shown in Equation 2 and the gain of H(jw) is shown in Equation 3.

Amplitude equalization is controlled by adjusting only the ratio of R2 to R1 and keeping R constant. The phase remains constant as long as L1, C1 and R are kept constant as shown in Equation 2. Phase equalization is controlled by adjusting only L1 and C1 and keeping the ratio of L1 to C1 constant. This minimizes the change in the amplitude equalization, which merely shifts up or down in frequency as seen in Equation 3.

The fine tuning of L1, C1, R1 and R2 is required to achieve optimum performance for a given recording system. In order to take advantage of the independent controls offered by the equalizer, the following sequence of events should be followed.

Figure 4:
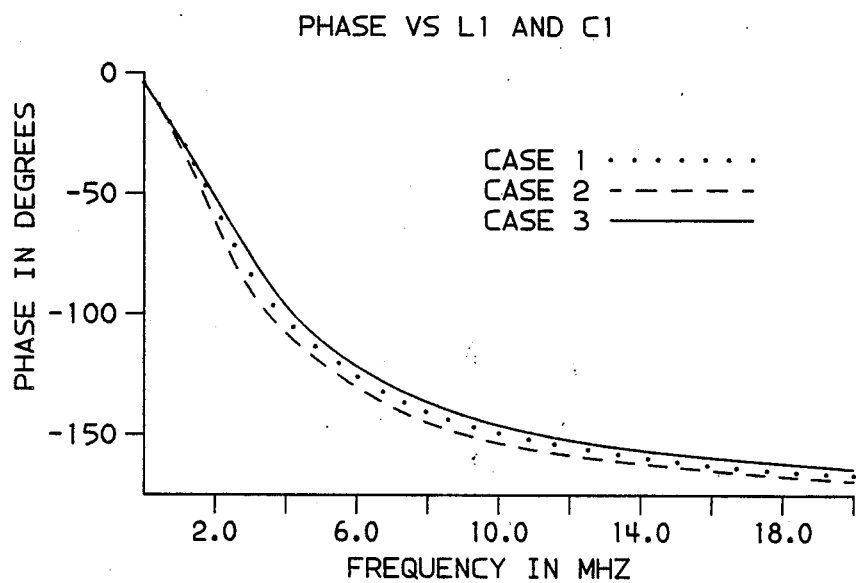
FIGS. 4 through 7 depict the frequency response.
Figure 5:
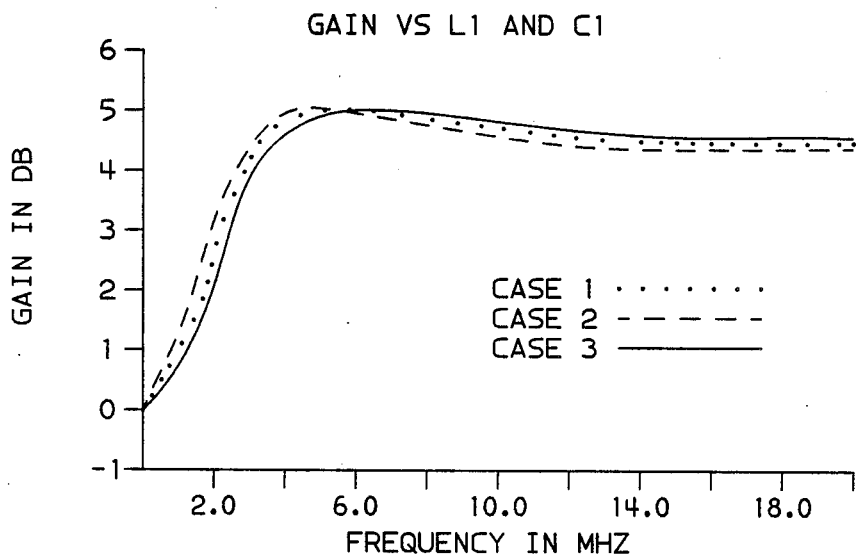

First, select the initial value of R. R is selected to accommodate the DC biasing of the circuit and to insure the values of L1 and C1 are reasonable. Next, select L1 and C1 such that the square root of the ratio L1 to C1 is approximately equal to R divided by two as explained earlier. Continue to adjust L1 and C1 in order to fine tune the phase to compensate for any phase non-linearity of the low pass filter or read-back signal, head or disk. FIG. 4 shows how the phase changes when both L1 and C1 are adjusted from nominal (case 1) to +10% (case 2) and −10% (case 3) while keeping the ratio of L1 to C1, R1 and R2 constant. FIG. 5 shows how the gain changes when both L1 and C1 are adjusted from nominal (case 1) to +10% (case 2) and −10% (case 3) while keeping the ratio of L1 to C1, R1 and R2 constant. Note that while adjusting the phase with L1 and C1, the amount of amplitude equalization remains constant although it is shifted in frequency.

Figure 6:
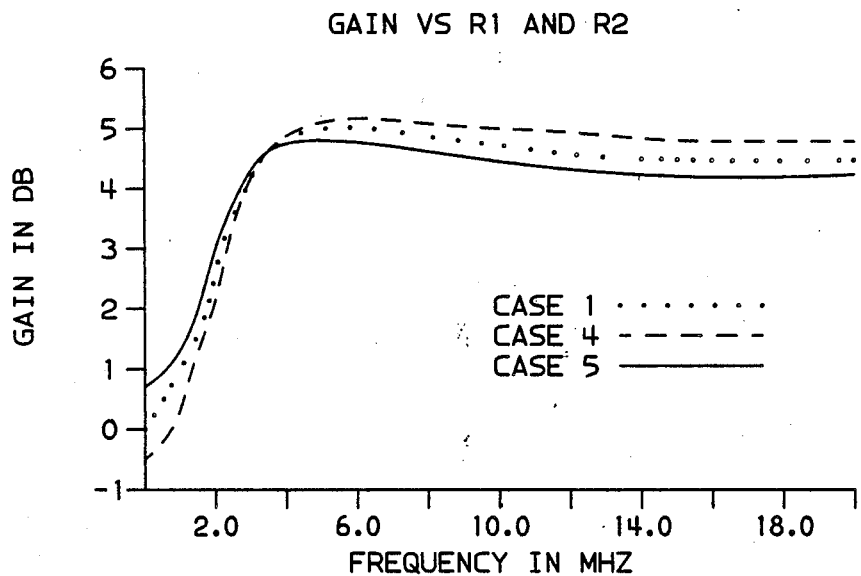
Figure 7:
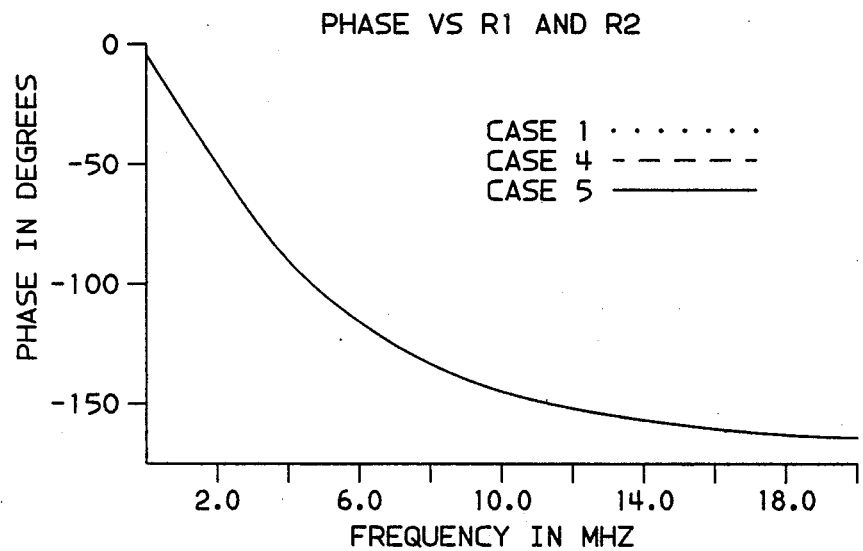

Once L1 and C1 have been selected for the proper phase equalization, the ratio of R2 to R1 should be fine tuned to obtain the desired amplitude equalization. FIG. 6 shows how the gain changes when the ratio of R2 to R1 is adjusted from nominal (case 1) to +10% (case 4) and −10% (case 5) while keeping L1, C1 and R constant. FIG. 7 shows how the phase changes when the ratio of R2 and R1 is adjusted from nominal (case 1) to +10% (case 4) and −10%. (case 5) while keeping L1, C1 and R constant. Note that while adjusting the gain with R2 and R1, the phase equalization remains constant.

This is a single ended equalizer that performs the required functions while affording a simplified circuit. The circuit does not duplicate the circuits of even the single stage as would be required for a double ended device using both inputs from the automatic gain control (+AGC and −AGC).

The differential amplifier 10 transmits the output pulse to a modified low pass (MLP) filter which is illustrated as a five pole Butterworth (BW) filter. BW filter 12 includes capacitors C6, C7 and C8 connected as shunts to ground and inductor elements L2 and L3 connected in series with the output of differential amplifier 10. The filter elements within BW filter 12 perform successive integrations of the pulse received from differential amplifier 10 producing a filtered pulse at the filter output which is supplied to the detection circuitry, +DET and −DET.

Figure 2:
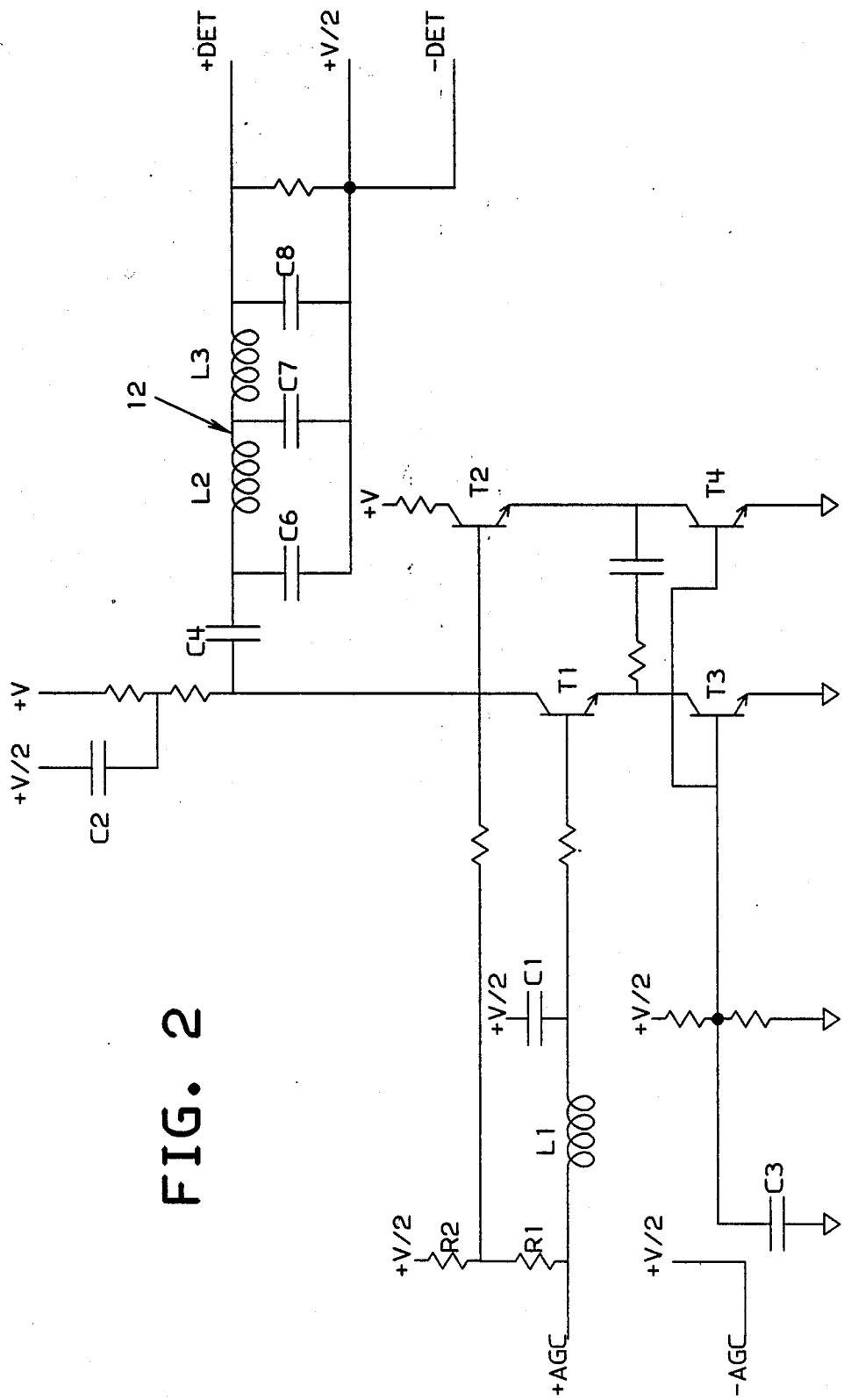
FIG. 2 is a more detailed circuit illustrating the equalizer and filter circuitry of FIG. 1.

In the environment of a magnetic disk storage device, a signal from the transducer coil is received by the arm electronics circuitry and transmitted through the automatic gain control (AGC) circuit to the detection circuits (DET). FIG. 2 is a device level showing of the RLC feedforward equalizer of FIG. 1. The +AGC input signal is applied to the input of the single ended equalizer that includes amplitude equalizing resistors R1 and R2 and the phase equalizing components, inductance L1, capacitance C1.

The circuit and method using a single stage as shown affords the lowest cost implementation and fewest circuit components. The simplicity of design is coupled with flexibility and convenience, since phase and amplitude can be independently adjusted with non-interfering controls. When chosen in sequence, the values of amplitude adjusting resistors R1 and R2 and the values of phase adjusting components, inductor L1 and capacitor C1 can be selected and adjusted independently of one another.

Figure 3:
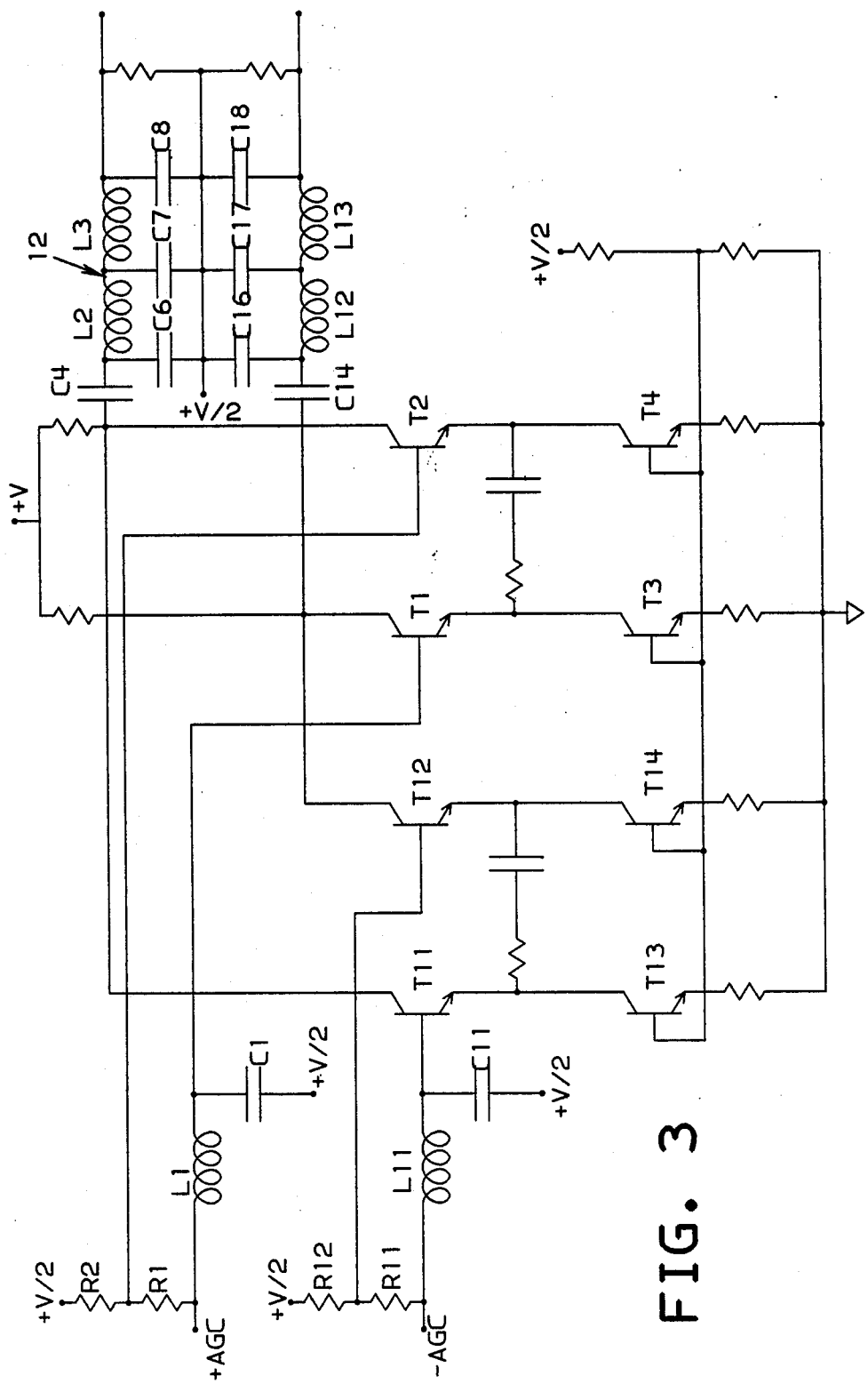
FIG. 3 illustrates a double ended, single stage equalizer using the single stage amplitude and phase compensation circuitry of FIGS. 1 and 2.

FIG. 3 shows a double ended equalizer which includes a similar single equalizer stage for each output of the AGC. This effectively duplicates the components in each branch of the equalizer circuit. The +AGC signal has amplitude adjustment, pulse slimming by selection of the resistance values of R1 and R2 and phase adjustment by selection of the values of inductor L1 and capacitor C1. The equalization stage output is fed to the differential amplifier including transistors T1, T2, T3 and T4 with the output from the differential amplifier received by the Butterworth filter 12 which includes capacitors C6, C7, C8 and inductors L1, L2. The −AGC signal is conditioned by an identical circuit wherein the amplitude equalization or pulse slimming is provided by resistors R11 and R12 and phase equalization is afforded by the selection of inductor 11 and capacitor 11. The differential amplifier includes transistors T11, T12, T13 and T14 and the filter 13 includes capacitors C16, C17, C18 and inductors L12, L13.

In a disk drive environment, the form factor or overall dimensions of the unit are usually set by a standard that has either been established or arrived at on a defacto basis. Within the dimensions space is at a premium as capacities are increased. The equalizer provides a low cost means of enhancing storage capacity at a constant soft error rate, but the inductor and capacitor components of this circuit function are not adaptable to inclusion in a large scale integration chip. These components use space or real estate on a printed circuit board where such space is in great demand and usually heroic efforts are undertaken to include all circuit components for the device on a single board. This makes the single stage with independently adjustable amplitude and phase corrections an attractive means of providing a beneficial function with a minimum number of components that must be individually mounted on the scarce surface of the planar board. This also dictates the use of the single sided equalizer structure of FIGS. 1 and 2 which provides the benefits of the circuit while using half the number of individually mounted components.

While the present invention has been described with reference to a preferred embodiment, other embodiments of the invention will be apparent to those skilled in the art. Therefore, the scope and spirit of the present invention is not to be limited by the foregoing description of the preferred embodiment of the invention.

What is claimed is:

1. An apparatus for conditioning read-back signals from a data storage media representing digital data including a feedforward equalizer means for equalizing the pulse signals comprising a single stage RLC circuit connected to the input of a differential amplifier having a first means for amplitude equalization and a second means for phase equalization;

said first means comprising a resistor divider circuit and said second means comprising a capacitance-/inductance circuit; and wherein said second means is adjustable to attain phase equilization and said first means is thereafter adjustable to attain amplitude equalization without disturbing the adjustment achieved by said second means.

2. The apparatus for conditioning pulse signals of claim 1 wherein said resistor divider circuit includes first and second resistors which are series connected and the values of said inductance and said capacitance are selected such that the characteristic impedance, the square root of the result of the inductance divided by the capacitance, is equal to the sum of the resistances of said first and second resistors.

3. The apparatus for conditioning pulse signals of claim 1 wherein the phase distortion introduced by the low pass filter is corrected by choosing the value of inductance (L) and capacitance (C) such that $$\frac{1}{2\pi \sqrt{LC}} = 0.8$$

times the filter cutoff frequency.

4. An apparatus for conditioning read-back signals from a data storage media representing digital data including feedforward equalizer means for equalizing the pulse signals comprising a single stage RLC circuit connected to the input of a differential amplifier having a first means for amplitude equalization and a second means for phase equalization.

wherein said second means comprises inductance means and capacitor means that are respectively selected to effect the desired phase equalization, and wherein said first means includes a pair of series connected resistors wherein the amplitude is a function of the ratio of the resistance value of one of said series connected resistors with respect to the resistance value of the other of said pair of series connected resistors and alteration of said ratio, without changing the sum of the resistances of said pair of resistors, alters the amplitude while the phase equalization remains constant.

5. The apparatus for conditioning pulse signals of claim 4 further including low pass filter means connected to the output of said differential amplifier.

6. The apparatus for conditioning pulse signals of claim 5 wherein the square root of the impedance of the inductance divided by the capacitance is approximately half the sum of the resistances of said pair of resistors.

7. An apparatus for conditioning read-back signals from a data storage media representing digital data including a feedforward equalizer means for equalizing the pulse signals comprising a single stage RLC circuit connected to the input of a differential amplifier having a first means for amplitude equalization and a second means for phase equalization, said first means and said second means being adjustable separately using non-interfering controls, and a low pass butterworth filter connected to the output of said differential amplifier.

* * * * *